United States Patent
Kerzner et al.

(10) Patent No.: US 11,860,637 B2
(45) Date of Patent: Jan. 2, 2024

(54) MOBILE DOCKING STATION

(71) Applicant: Alarm.com Incorporated, Tysons, VA (US)

(72) Inventors: Daniel Todd Kerzner, McLean, VA (US); Donald Gerard Madden, Columbia, MD (US); Babak Rezvani, Tysons, VA (US); Ahmad Seyfi, Tysons, VA (US); Glenn Tournier, Vienna, VA (US)

(73) Assignee: Alarm.com Incorporated, Tysons, VA (US)

( * ) Notice: Subject to any disclaimer, the term of this patent is extended or adjusted under 35 U.S.C. 154(b) by 290 days.

(21) Appl. No.: 17/174,810

(22) Filed: Feb. 12, 2021

(65) Prior Publication Data

US 2021/0255636 A1   Aug. 19, 2021

Related U.S. Application Data

(60) Provisional application No. 62/976,668, filed on Feb. 14, 2020.

(51) Int. Cl.
*G05D 1/02*   (2020.01)
*G05D 1/00*   (2006.01)

(52) U.S. Cl.
CPC ......... *G05D 1/0225* (2013.01); *G05D 1/0027* (2013.01); *G05D 1/0088* (2013.01); *G05D 1/0223* (2013.01); *G05D 2201/0207* (2013.01)

(58) Field of Classification Search
CPC .. G05D 1/0225; G05D 1/0027; G05D 1/0088; G05D 1/0223; G05D 2201/0207
See application file for complete search history.

(56) References Cited

U.S. PATENT DOCUMENTS

| | | | |
|---|---|---|---|
| 2015/0370251 A1* | 12/2015 | Siegel | G01C 21/20 701/2 |
| 2019/0012636 A1* | 1/2019 | Simon | G08G 5/0043 |
| 2020/0262307 A1* | 8/2020 | Rosene | B60L 53/68 |
| 2021/0155221 A1* | 5/2021 | Gottehrer | B60W 20/40 |
| 2023/0005274 A1* | 1/2023 | Iwamoto | B60W 60/0015 |

* cited by examiner

*Primary Examiner* — Anne Marie Antonucci
*Assistant Examiner* — Jingli Wang
(74) *Attorney, Agent, or Firm* — Fish & Richardson P.C.

(57) ABSTRACT

Methods, systems, and apparatus, including computer programs encoded on computer-storage media, for a mobile docking station. In some implementations, a method for a mobile docking station includes receiving a service request from a first user; determining assignment details based on the service request; determining a plurality of devices to send to a location based on the assignment details; deploying the plurality of devices to the location; receiving data from a first device of the plurality of devices; based on the data, scheduling a pickup of the first device; and deploying a second device for the pickup of the first device.

20 Claims, 4 Drawing Sheets

MOBILE DOCKING STATION

CROSS-REFERENCE TO RELATED APPLICATION

This application claims the benefit of U.S. Provisional Application No. 62/976,668, filed on Feb. 14, 2020, the contents of which are incorporated by reference herein in its entirety.

BACKGROUND

Many properties are equipped with monitoring systems that include sensors and connected system components.

SUMMARY

Techniques are described for a mobile docking station that deploys, receives, or services autonomous or semi-autonomous devices. The mobile docking station can exist within a system of other components and other mobile docking stations. A mobile docking station can navigate to locations of interest and deploy a device, such as a drone, for a mission or patrol. After mission completion or determination by a central control unit, the mobile docking station or another mobile docking station within the system, can receive the device and perform service actions including charging, maintenance, or other deployment.

In one aspect, the disclosure provides a method including receiving a service request from a first user; determining assignment details based on the service request; determining a plurality of devices to send to a location based on the assignment details; deploying the plurality of devices to the location; receiving data from a first device of the plurality of devices; based on the data, scheduling a pickup of the first device; and deploying a second device for the pickup of the first device.

In some implementations, before scheduling the pickup of the first device, the method may further include: determining one or more available capabilities of the second device; and selecting, based on the data from the first device of the plurality of devices and the one or more available capabilities of the second device, the second device for the pickup of the first device.

In some implementations, selecting, based on the data from the first device of the plurality of devices and the one or more available capabilities of the second device, the second device for the pickup of the first device may include: determining, based on the data from the first device, one or more required capabilities of the second device; determining the one or more available capabilities of the second device include at least the one or more required capabilities; and selecting the second device for the pickup of the first device based on determining the one or more available capabilities of the second device include at least the one or more required capabilities.

In some implementations, deploying the second device for the pickup of the first device may include: comparing a current location of the second device to a current location of a third device; and deploying the second device for the pickup of the first device based on the current location of the second device being closer to the location than the current location of the third device.

In some implementations, the plurality of devices may include a mobile docking station and a third device, and deploying the plurality of devices to the location may include: deploying the mobile docking station to a second location that is within a first distance from the location; and configuring instructions on the mobile docking station to enable deploying of the third device from the mobile docking station to a third location that is within a second distance from the location, where the second distance is less than the first distance.

In some implementations, deploying the mobile docking station to the second location that is within the first distance from the location may include: determining a first region in which the mobile docking station is configured to operate; determining a second region adjacent to the first region in which the mobile docking station is not configured to operate; and determining a location within the first region that is closest to the location as the second location, where the first region does not include the second region.

In some implementations, the mobile docking station may be a road-going mobile docking station and the first region may be a section of road.

In some implementations, before receiving the service request from the first user, the method may further include: deploying the second device for autonomous patrol; and sending system status information to the second device to inform movements of the second device during autonomous patrol.

In some implementations, the second device may be a mobile docking station, and deploying the second device for autonomous patrol may include: determining a number of active mobile docking stations in a first service region; determining the number of active mobile docking stations in the first service region satisfies a threshold; and in response to determining the number of active mobile docking stations in the first service region satisfies the threshold, deploying the second device for autonomous patrol in the first service region.

In some implementations, the data from the first device of the plurality of devices may include device status information and scheduling the pickup of the first device may include selecting the second device for the pickup of the first device based on the device status information.

In some implementations, selecting the second device for the pickup of the first device based on the device status information may include: determining a first device location of the first device based on the device status information; determining a second device location of the second device; determining the second device is capable of moving to a second location in a vicinity of the first device location based on detecting that the second device is a mobile docking station with movement capabilities and determining that the second device location is within a threshold distance of the first device location; and selecting the second device for the pickup of the first device based on determining the second device is capable of moving to the second location.

In some implementations, the threshold distance may be calculated based on a computed route from the second device location to the second location, a speed of the second device, and a required pickup time for the pickup of the first device, where the second location is where the pickup of the first device occurs.

In some implementations, determining the plurality of devices to send to the location based on the assignment details may include: determining one or more required capabilities based on the assignment details; determining one or more available capabilities for each device of the plurality of devices; determining the one or more available capabilities for each device of the plurality of devices include at least the one or more required capabilities; and determining the plurality of devices to send to the location based on determining the one or more available capabilities for each device of the plurality of devices include at least the one or more required capabilities.

In some implementations, determining the plurality of devices to send to the location based on the assignment details may include: determining one or more required capabilities based on the assignment details; determining a first set of one or more available capabilities for the first device; determining a second set of one or more available capabilities for a third device; comparing the first set of one or more available capabilities and the second set of one or more available capabilities to the one or more required capabilities; and based on comparing the first set of one or more available capabilities and the second set of one or more available capabilities to the one or more required capabilities, selecting the first device as a member of the plurality of devices to the location and not selecting the third device.

In some implementations, determining the assignment details based on the service request may include: parsing the service request to determine the service request is a request of the first user; and determining, based on determining the service request is a request of the first user, a priority level of the service request.

In some implementations, determining the priority level of the service request may include: determining a user subscription tier corresponding to the first user; and determining the priority level of the service request based on the user subscription tier.

In some implementations, the plurality of devices may include a mobile docking station and one or more devices that are configured to dock with the mobile docking station.

In some implementations, the plurality of devices are deployed at a second location, and the pickup of the first device may occur at a third location that is different from the second location.

The docking station can provide energy, transportation, maintenance or other mission assistance (e.g., computation, instructions, analytics, etc.). A central system connected to one or more devices or docking stations can determine how the devices are deployed based on requests from users or dispatchers, data sent from a component within a docking station system, or data sent from another system with a connection to the docking station system.

In some implementations, advantageous implementation can involve using an autonomous vehicle to serve as a mobile docking station for multiple drones. This mobile docking station can move around a location, such as a neighborhood, dispatching drones where the drones are needed and collecting drones that have completed a mission or drones that require service. Drones can communicate with the mobile docking station through any suitable network. The network, or a device within the network, can determine what actions are required from the device or the mobile docking station based on signals from the device or the mobile docking station.

In some implementations, a group of devices can work together. For example, a network of drones can establish a hierarchy where the larger drones (e.g., self-driving car) travel to locations where assistance is needed and then dispatch the smaller drones (e.g., quad-copter, rover) to perform actions in locations where the larger drones cannot.

In some implementations, a device can be sent to a moving location. For example, in a car chase, the police can input a request for a mobile docking station carrying multiple drones to monitor a suspect driving a car. The drones can monitor the moving car in turns, flying back to the moving mobile docking station when a battery is low or other stimulus occurs (e.g., drone becomes unresponsive or breaks, sufficient data is gathered, sufficient time spent monitoring, additional requests from users or computer entities, etc.). The mobile docking station can swap a depleted battery within a drone or device for a charged battery. Swapping batteries can be a quicker alternative to charging the depleted battery within a drone or device.

Mobile docking stations can patrol autonomously or semi-autonomously in given areas while dispersing other mobile docking stations or autonomous drones creating a network. The network of mobile docking stations and drones can stretch to cover a large geographical area increasing the coverage of a system and also the speed and efficiency of drone assignments.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
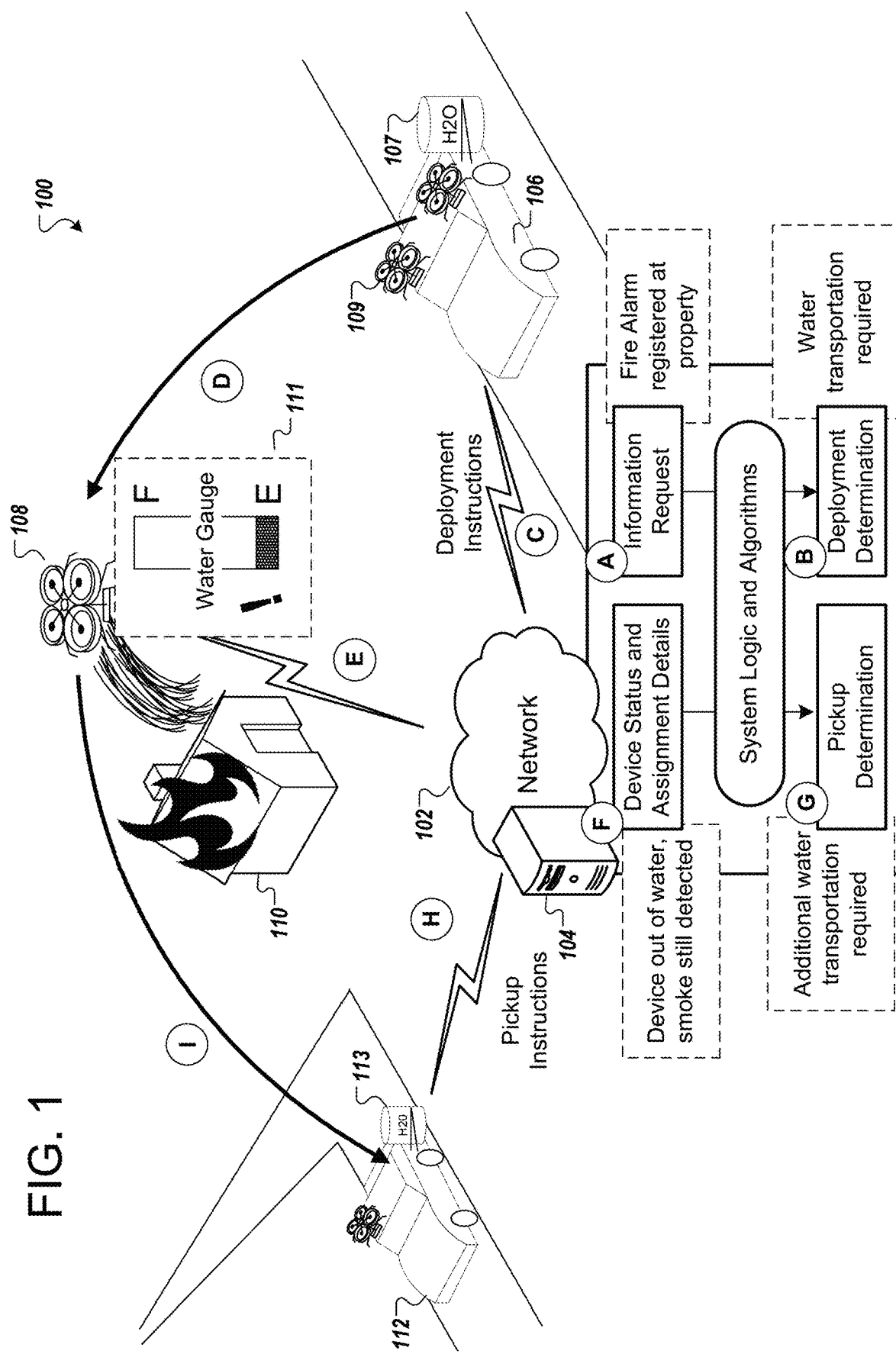
FIG. 1 is a diagram showing an example of a mobile docking station system.

FIG. 1 shows a mobile docking station system 100. The system 100 includes a network 102, a control unit 104, a mobile docking station 106, a device 108, a property 110, and a second mobile docking station 112. The FIG. 1 shows a situation in which the mobile docking station 106 goes to the property 110 to put out a fire.

The mobile docking station 106 is equipped with a water tank 107. The water tank 107 can be registered within the network 102 such that, for instances where docking stations equipped with a water tank are needed, the network 102 can recognize the mobile docking station 106 is equipped with a water tank 107.

In some implementations, the components of the system 100 can have communication technology such that data can be transferred from one component of the system 100 to another component of the system 100. For example, the device 108 can be a type of autonomous aerial drone. The device 108 can have communication technology such that data can be transferred to the device 108 from the control unit 104 and from the device 108 to the control unit 104.

In stage A, the network 100 receives an information request. The information request can be one of a list of information requests sent to the system 100. In this example, the information request is associated with a fire alarm notification registered at the property 110. The control unit 104 can use data from the information request along with other system data (e.g., priority queues, network traffic, etc.) to determine an action related to the information request. In some cases, the action can involve deploying a device to a location.

In some instances, the control unit 104 may determine that device deployment is not necessary. For example, if other sensors or cameras already on site are capable of performing a necessary action, the control unit 104 can decide not to send devices based on a request.

In some implementations, priority queues can influence the deployment determination made by the control unit 104. For example, if two requests are received by the control unit 104, one requesting a drone to inspect a downed tree on a property, and the other requesting assistance in stopping a fire, the control unit 104 can prioritize the assistance in stopping the fire. Requests can be given a priority based on factors such as number of users or people affected, time sensitivity, user subscription tier, or type of emergency.

In some implementations, the origin of the information request (e.g., a property owner, a central station, a law enforcement officer, etc.) can influence the priority queue. For example, a request from a central station or dispatcher may take priority over a routine request from a property owner.

In some implementations, the deployment determination can involve multiple actions. For example, the control unit 104, based on a fire and a burglary at a property can send separate devices with capabilities tailored to either firefighting or anti-burglary (e.g., video surveillance) to aid in different emergencies at the property. Similarly, a single device active and in range could be given multiple assignments by a central station or control unit. For example, a device could be given assignments to both drop water on the location of a fire and record video of the exterior property.

In stage B, the control unit 104 determines a deployment strategy. This determination can be based on system logic or algorithms operating on information request data or other data available to the system 100 (e.g., other requests, local roadway traffic). Based on the fire alarm registered at the property 110, the control unit 104 determines that a device with water transportation capabilities should be deployed.

In stage C, the control unit 104 sends deployment instructions to a mobile docking station 106. The mobile docking station 106 can be chosen to perform the assignment based on multiple factors. For example, because the control unit 104 requested water transportation, the fact that the mobile docking station 106 is equipped with a water tank 107 would give the mobile docking station 106 priority over another mobile docking station without a water tank. The other mobile docking stations can be within an area adjacent or nearby the property 110. Another factor could be relative distance. If the mobile docking station 106 was the closest of a number of similarly equipped mobile docking stations, an advantageous implementation could involve the control unit 104 choosing the closest device with sufficient capabilities which, in this case, could be the mobile docking station 106. The deployment instructions can include a location for the docking station or the device to navigate towards.

In some situations, the instructions might enable the docking station 106 to perform secondary calculations for deployment. For example, if deployment is needed at a location that cannot be reached by the mobile docking station 106, the mobile docking station 106 can determine where in the proximity of the location to navigate towards and then release a device to navigate the remaining distance to the location. In some implementations, this calculation can be contained within the instructions from the control unit 104. In other implementations, the calculation can be done by a component of system 100 (e.g., mobile docking station 106).

In stage D, the device 108 separates from the docking station 106 and navigates to the property 110. The movement of the device 108 can be controlled by instructions from the control unit 104, instructions from the mobile docking station 106, input from the device 108 itself, input from another component of system 100, or a combination of different inputs (e.g., deployment instructions from the control unit 104 and input from onboard cameras and sensors, deployment instructions from the mobile docking station 106 and input from onboard cameras and sensors, etc.).

In some implementations, more than one device can be dispatched from the mobile docking station 106. For example, instead of only the device 108 departing the docking station 106, device 109 can also be dispatched to the property 110.

In stage E, the device 108 releases water onto the fire burning on property 110. The release of water causes the water gauge 111 to drop from full to near empty. The device 108 can be programmed to perform certain operations when certain on board situations arise. In this example, the water gauge 111 reading near empty can instigate a communication of data from the device 108 to the control unit 104 through the network 102. The communication can contain data of interest for pickup such as location, maintenance status or water level.

In some implementations, additional data from a device can be analyzed by the control unit 104. The data sent to the control unit 104 from the device 108 can include external images of the property. The external images can be analyzed by the control unit 104 to determine if the fire is still burning or has been put out. A determination can also be made internally by the device 108 depending on implementation. The status of the device 108 can also be communicated to the control unit 104. The status can include things pertinent to the operation of the device 108. For example, the device 108 can send its current battery levels, damage reports, maintenance issues, location, or other data. The control unit 104 can use this data to determine necessary actions. In some cases, the control unit 104 or another component of system 100 can store the data sent from the device 108 for further analysis.

In some implementations, a device can perform an assignment without communicating with a central station or control unit. For example, the device 108 could be given instructions that can be carried out without further communication with a central station or control unit. Initial instructions could include specific motion vectors for the device 108 to execute or objectives to move towards as well as data to capture. Initial instructions could also include return motion vectors back or return objectives to move towards and a landing location.

In some implementations, the device 108 can possess sufficient computing power to determine necessary actions based on external or internal data. For example, if the battery level indicates low power on the device 108, the device 108 can determine what action is necessary without sending data to a control unit. An action in this case could be to communicate to nearby mobile docking stations to find a mobile docking station with charged batteries ready to be installed. The device 108 could use additional data to make a determination. For example, given a priority assignment, the device 108 could choose to go to a mobile docking station that does not have a fully charged battery available but is closer than another mobile station that does have a fully charged battery available if the time saved would be beneficial in completing the current priority assignment.

In stage F, the control unit 104 receives device status and assignment details pertaining to device 108. Based on either data gathered from the device 108 or data processed from other components of system 100, the control unit 104 can make a determination on what action will be performed and what components will perform that action. In this case, data from the device 108 and data from the property 110 can be used. In some implementations, the number of components used to make a determination can be larger or smaller. The data from the device 108 shows that the water gauge of device 108 is near empty. The data from the property shows that the smoke detector on the property 110 still detects smoke. Based on these two pieces of data, the control unit 104 can process a determination concerning an action to take.

In some implementations, an action to take can be determined without a central unit but rather through direct inter-device communication. For example, the smoke detector could communicate directly with the device 108.

In stage G, the control unit 104 determines that the action to take will involve a pickup of the device 108. The determination for a pickup can involve the data from device 108 or other data within the system 100. For example, the data of device 108 can include a water gauge indication or data from the property 110. If the water level of the device 108 is near empty, the control unit 104 can arrange for a mobile docking station equipped with water tanks to rendezvous with the device 108 for refilling.

In some implementations, other data captured by a component of the system 100 can be used to inform actions within an assignment. For example, the device 108 can send images to the control unit 104 which can be processed and analyzed to determine contents and significance. Images of a fire could be used to determine if the fire is still burning as well as the severity of the burn. The analysis, in some cases, can be performed on the device 108.

The pickup determination can also involve other accessible data within the system 100. For example, if another information request is received with higher priority, the control unit could recall and re-deploy device 108 to complete the other information request. The control unit 104 can use the location of the device 108 to schedule a pickup of a nearby mobile docking station. The control unit 104 can use other pertinent information about a device to schedule a mobile docking station pickup. For example, if data sent from the device 108 shows that maintenance on the device 108 is required, the control unit 104 can arrange for a mobile docking station outfitted with repair equipment to receive the device 108.

In some implementations, the control unit 104 can arrange for a mobile docking station that is not outfitted with repair equipment to receive the device 108. The mobile docking station can use a third party to repair the device 108. For example, the mobile docking station can be on its way to a repair depot capable of repairing the device 108. The control unit 104 can determine, based on the current directive of the mobile docking station, that the mobile docking station is suitable to receive the device 108.

In some implementations, the pickup determination can be performed by another component of the system 100. For example, the device 108 could communicate directly with the mobile docking station 112.

In stage H, the pickup instructions from the control unit 104 are sent to the mobile docking station 112. The control unit 104 can also communicate with the device 108 to coordinate the pickup. In this case, mobile docking station 112 is chosen because the mobile docking station 106 has depleted the water tank 107 and is no longer carrying water for the device 108 to put out the fire on the property 110. The mobile docking station 112 with a full water tank 113 is called to refill the water of the device 108.

To pick up the device 108, the pickup instructions can include pertinent information concerning the device 108 and other data within the system 100. For example, the location, estimated time of arrival, or condition can be sent from the control unit to the mobile docking station 112. Information sent can aid in the pickup process or prepare automated processes for pickup. For example, if water refilling is required for the device 108, the control unit 104 can send instructions within the pickup instructions or through subsequent communications, that the device 108 requires water refilling. If maintenance is required for the device 108, the control unit 104 can send instructions within the pickup instructions or through subsequent communications, that the device 108 requires maintenance. The instructions can be passed to autonomous or semi-autonomous devices onboard the mobile docking station 112 that can interpret and perform the required maintenance.

The mobile docking station 112 can communicate with the control unit 104 or other components within the system 100 to carryout tasks. For example, if the water tank of 113 was leaking and no water was available, the mobile docking station 112 could communicate with other components of the system 100. In some cases, a system response could include sending another mobile docking station with a functioning water tank.

In some implementations, the mobile docking station 112 can be the same docking station as the mobile docking station 106. For example, the mobile docking station of origin can move and receive the device 108 at a different location from where the device departed.

In some implementations, the mobile docking station used to dispatch a device can be of a different type than the mobile docking station used to receive the device. For example, the mobile docking station 106 may be outfitted with different maintenance or storage features compared to the mobile docking station 112.

In stage I, the device 108 docks on the mobile docking station 112. While docked, the device 108 can be refilled with water from the water tank 113. Any additional maintenance or recharging can be performed at this time. In some cases, charging can involve replacing the battery of the device 108 with a charged battery. After docking, the mobile docking station 112 can re-deploy the device 108 or another device. In some cases, further instructions can be made by the control unit 104.

The devices in the mobile docking station system 100 can be either fully autonomous or semi-autonomous depending on implementation. For example, the mobile docking station 106 can be an autonomously driven road-going car or a road-going car operated by a human.

Subsystems attached or within a device of the mobile docking station system 100 can be either fully autonomous or semi-autonomous. For example, the water refilling action performed by the mobile docking station 112 on the device 108 can either be autonomously performed by a water refilling machine or performed by a human. In some cases, a human can instigate other systems which can be autonomous. For example, a human could align a semi-autonomous device for water refilling by hand before activating and allowing the semi-autonomous device for water refilling to automatically refill the water level of the device 108.

Figure 2:
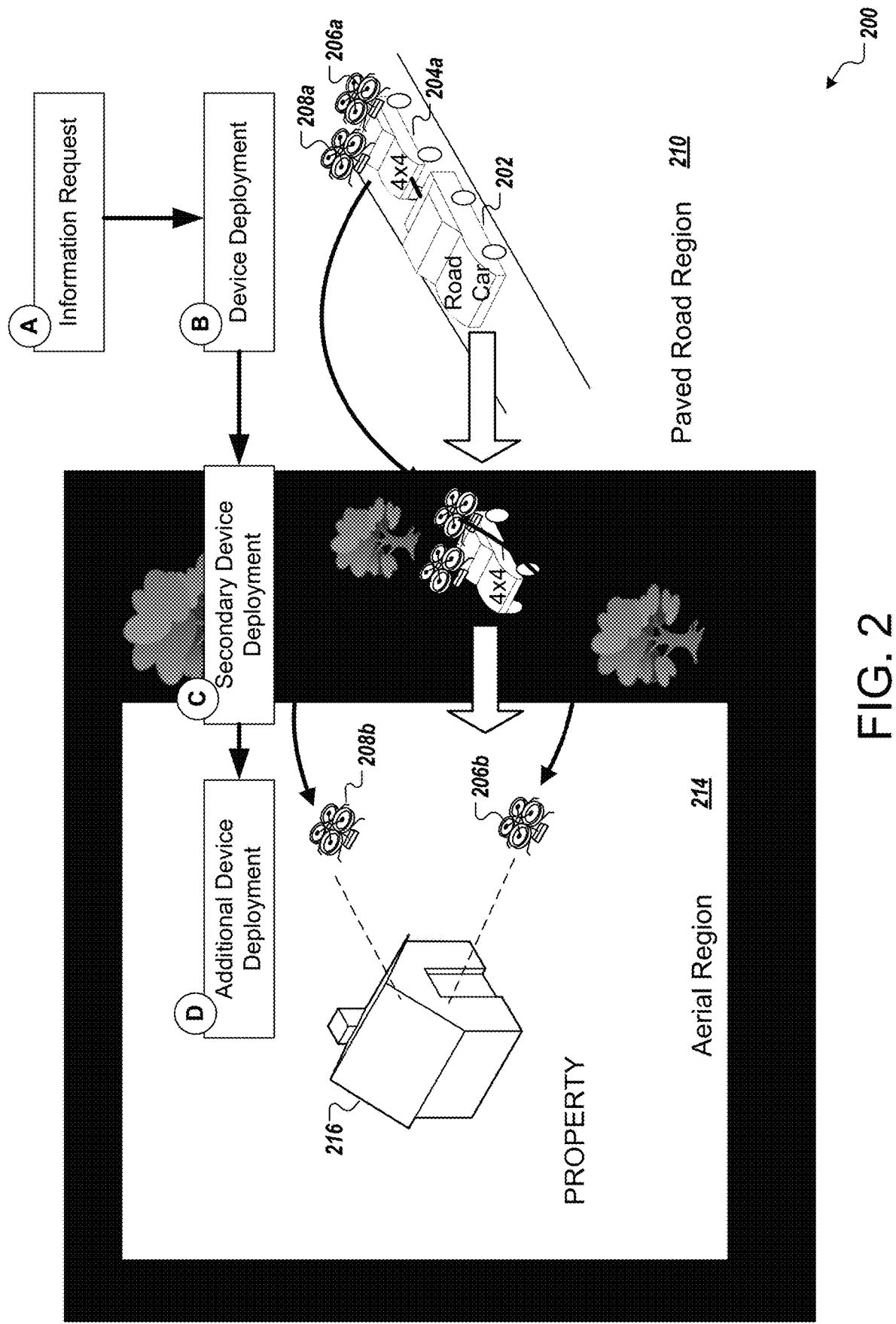
FIG. 2 is a diagram showing a deployment strategy of a mobile docking station system.

FIG. 2 is a diagram showing a deployment strategy of a mobile docking station system 200. The system 200 includes a road-going mobile docking station 202, an off-road mobile docking station 204, an aerial device 206, a second aerial device 208, a paved road region 210 where the road-going mobile docking station 202 can operate, an off-road region 212 where the off-road mobile docking station 204 can operate, an aerial region 214 where the aerial devices 206 and 208 can operate, and a property 216 that serves as an objective. The FIG. 2 shows a situation in which the road-going mobile docking station 202 goes to the property 216 and dispatches the off-road mobile docking station 204 which, in turn, dispatches the aerial devices 206 and 208 that monitor the property 216.

The addition of 'a' or 'b' to an item of FIG. 2 is used to show the same device at different times or locations. For example, the off-road mobile docking station 204 is shown in the paved road region 210 as item 204a. The off-road mobile docking station 204 is shown in the off-road region 212 as item 204b.

In some implementations, the property 216 can have communication technology such that data can be transferred to the property 216 from another component of the system 200 and from the property 110 to another component of the system 200.

A control unit or central station can be used together with the components of system 200 to aid in information requests. For example, a control unit can help determine which of a number of devices within a system is assigned to the property 216. In some implementations, the determination can be made by components within the system 200 independent of a control unit or central station.

The components of the system 200 can have communication technology such that data can be transferred from one component of the system 200 to another component of the system 200. This communication can take place along any suitable configuration of wired or wireless connection. For example, the off-road mobile docking station 204 can communicate the status of device 206 and 208 to the road-going mobile docking station 202.

The system 200 can service an information request by assigning devices of the proper capabilities for each task. Each component in the system 200 can maintain a schedule for pre-arranged tasks for events in the future but can also allow for preemption in the case of emergency or a situation of higher priority than an existing task. In some cases, the devices deployed can be robots. A mobile docking station can be assigned to deliver the robots as close as possible to assignments and to pick them up when finished. In some cases, the closest possible location to an assignment could be on the side of a road before a section of wilderness. Robots may be dropped off by one mobile station and picked up by another, depending on scheduling. In some cases, a mobile station may remain at the drop-off location. For example, a mobile station can remain at the drop-off location if the mobile station is waiting on multiple robots at or near a given location.

In some cases, the system might employ additional levels of hierarchy. For example, the road-going mobile docking station 202 could deploy an off-road mobile docking station 204 capable of travelling off-road and serving as a docking station for one or more smaller docking stations or flying drones.

In stage A of FIG. 2, an information request is sent to the system 200. An information request may be generated by multiple dispatchers (e.g., a central station, direct requests from homeowners, an automated monitoring agent, etc.). Different dispatchers may be serviced with different priorities. For example, a request from a central station or dispatcher may take priority over a routine request from a property owner.

In stage B, the information request is received by the system 200. The road-going mobile docking station 202 together with the off-road mobile docking station 204a and aerial drones 206a and 208a are deployed. The process of deploying the devices can be similar to the process of FIG. 1 in which a control unit or central station collects data about the request and data within the system 200 or surrounding systems and makes a determination of what capabilities are needed to perform the task. The control unit or central station can find devices that match the capability requirements of the determination. In this case, the road-going mobile docking station 202 together with the off-road mobile docking station 204a and aerial drones 206a and 208a match the capability requirements of the determination.

In stage C, the road-going mobile docking station 202 reaches the end of the paved road region 210 and dispatches the off-road mobile docking station 204b. The off-road mobile docking station 204b is the same device as item 204a but shown after separation from the road-going mobile docking station 202. The off-road mobile docking station 204b still carries the aerial drones 208a and 206a. The off-road mobile docking station 204b allows the drones 208a and 206a to get closer to the property 216 before being deployed.

In some implementations, a physical connection can be maintained between the off-road mobile docking station 204b and the road-going mobile docking station 202. For example, the physical connection can be used for power transfer. Techniques like a physical connection can be used to increase the duration in which the off-road mobile docking station 204b is functional.

In stage D, the off-road mobile docking station 204b reaches the end of the off-road region 212. At this point, the off-road mobile docking station 204b can deploy the aerial drones 206b and 208b. Aerial drones 206b and 208b are the same drones as 206a and 208a but shown at a later time.

In stage D, the aerial drones 206b and 208b reach the property 216. Once the aerial drones reach the objective, property 216, the assignment can be completed based on the data received in the information request or subsequent data gathered by a component of the system 200. After assignment completion, the aerial drones can either land back on the off-road mobile docking station 204b or on another docking station within the system 200 or within the surrounding region of property 216. Before assignment completion, the aerial drones 206b and 208b can stop back on the off-road mobile docking station 204b or on another docking station within the system 200 or within the surrounding region of property 216. Stops before assignment completion can be used for a variety of tasks. For example, the drone 206b may need a battery replacement. The drone 206b could land back on mobile station 204b and have a new battery installed. Similarly, the drone 206b could land on the road-going mobile station 202. In some cases, additional communication from the drone 206b could be used in determining which device within a system can service the needs of the drone 206b.

In some cases, the aerial region 214 can be an exclusive aerial region. For example, in areas surrounded by water or debris from a hurricane, aerial drones can be used to reach an objective which otherwise could prove difficult with either a road-going device or off-road device.

In some implementations, a system can be configured in a tree-based distribution strategy. For example, a road-going station could deploy a payload of mid-level stations (e.g., an off-road mobile docking station) at even intervals without explicit requests from a user or other dispatcher. In some cases, multiple road-going stations within a system could deploy multiple payloads of mid-level stations. The mid-level stations could also fan out before deploying additional devices. In some cases, these additional devices could be autonomous drones. The effect of the tree-based distribution strategy could be greater coverage over a given area that could reduce response time for information requests from users or systems.

Figure 3:
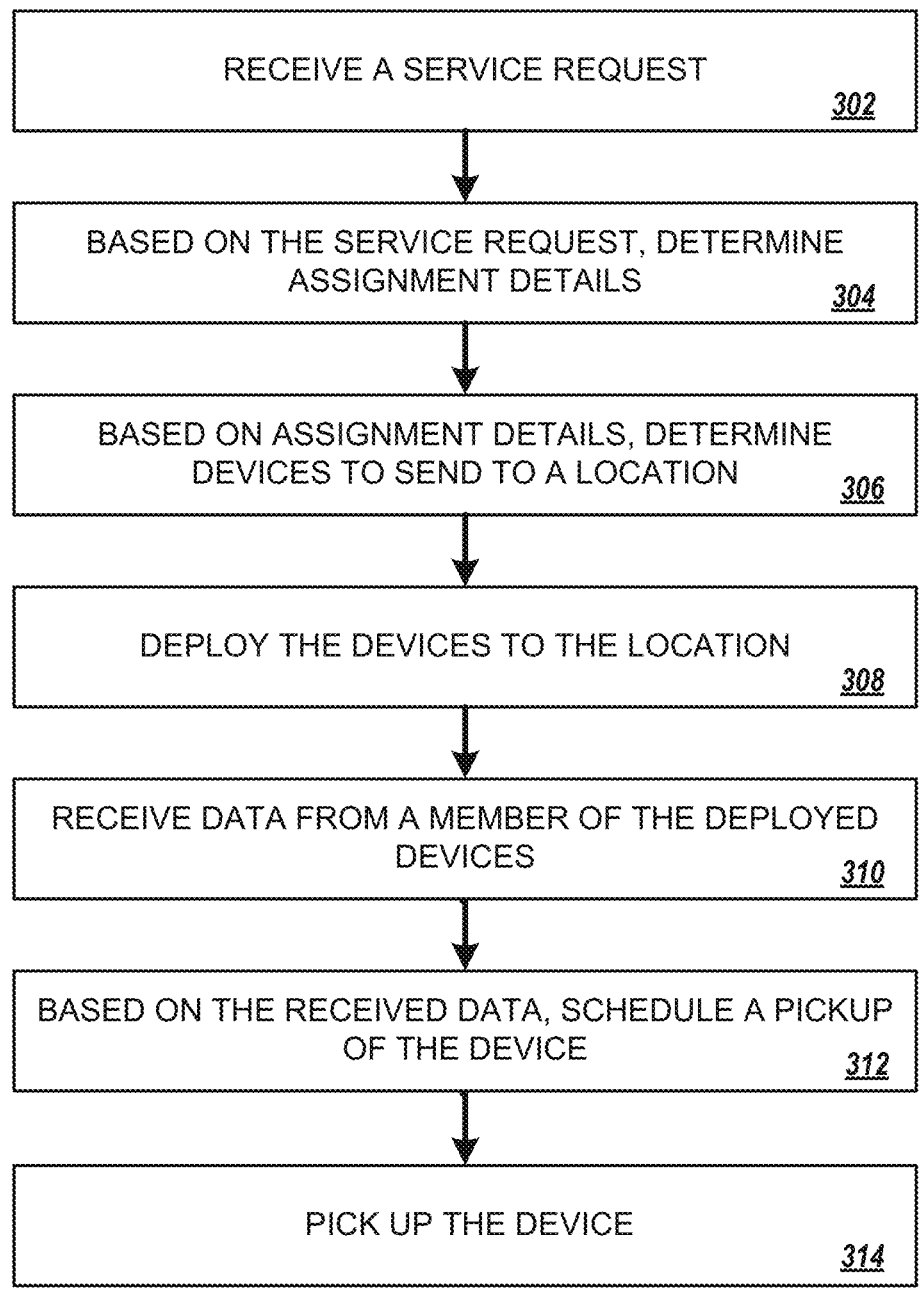
FIG. 3 is a flow diagram illustrating an example of a process for a mobile docking station

FIG. 3 is a flow diagram illustrating an example of a process for a mobile docking station. The process 300 may be performed by one or more electronic systems, for example the system 100 of FIG. 1.

The process 300 includes receiving a service request (302). For example, the control unit 104 registers a fire alarm activated at the property 110.

In some implementations, one or more devices are deployed for autonomous patrol. For example, before receiving a request, the control unit 104 can deploy one or more devices in the vicinity of the property 110. The control unit 104 can determine to deploy the one or more devices in the vicinity of the property 110 based on a number of factors. In some implementations, the number of factors includes a number of active devices in the area. For example, the control unit 104 can determine that a region does not have a sufficient number of active devices. In addition, the control unit 104 can determine that, if a service request or pickup request were to be received, response time would not satisfy a required threshold. The control unit 104 can then deploy one or more devices, such as the mobile docking station 112. As shown in FIG. 1, the mobile docking station 112 can then be used in subsequent operations such as a pickup operation.

In some implementations, a device on autonomous patrol receives data updates from a control unit. For example, the mobile docking station 112 can receive data updates from the control unit 104 that a service request has been received from a user corresponding to the property 110. Without requiring any operation performed by the mobile docking station 112, the control unit 104 can send a signal to the mobile docking station 112 that is configured to provide the mobile docking station 112 with current status information of the overall system such that the mobile docking station 112 is positioned to aid in operations. In some implementations, the control unit 104 computes a new region for the mobile docking station 112 to patrol that is closer to the property 110 after receiving the request related to the property 110.

In some implementations, details of the request are used to determine how devices patrol a given region or what region to patrol. For example, as shown in the example of FIG. 1, if a service request indicates the possibility of a fire at the property 110, any device with capabilities that would be suitable for fighting a fire (e.g., water tanks, water hoses) can be sent to patrol in a vicinity of the property 110. In this way, the devices sent to patrol in the vicinity of the property 110 can be deployed by a control unit to the location with less delay if deployment becomes necessary.

The process 300 includes determining assignment details based on the service request (304). For example, the control unit 104 determines that a device should be deployed to the property 110 to put out the fire at property 110.

The process 300 includes determining devices to send to a location based on assignment details (306). For example, the control unit 104 determines, based on a detected fire alarm, that a mobile docking station with water transportation capabilities should be used for the assignment.

In some implementations, capabilities of multiple devices are determined to select one or more devices to send to the location. For example, a control unit, such as the control unit 104, can determine the required capabilities for a given request. In the example of FIG. 1, the required capabilities can include aerial mobility, water dispensers, and heat resistance. The control unit 104 can further determine, based on stored capabilities of one or more devices in a system or by receiving capability updates in response to sending a request for capability updates from one or more devices, available capabilities from one or more devices. Based on a comparison between the available capabilities of a given device and the required capabilities determined based on the request, the control unit 104 can select one or more devices. In some cases, all required capabilities are met by the available capabilities of a selected device. In other cases, devices are selected based on a comparison of how many capabilities of the required capabilities they can provide in addition to other factors such as proximity to the location corresponding to the request, current operational status, prior missions, expected new missions, among others.

In some implementations, devices are determined based on priority levels. For example, priority levels can be determined by a control unit, such as the control unit 104, for a given request. Based on the determined priority level, the control unit can select devices to be deployed. For example, for a request corresponding to a low priority, the control unit can send a device with less available capabilities or a device at a later time than if the request was of a higher priority. In some cases, a subscription level of a user can dictate what priority a request is given. In some cases, details of a request are processed by a control unit, such as the control unit 104, to determine a corresponding priority.

In some implementations, additional data from the system, such as data from sensors, data from properties, or data from other devices, is used to determine operations in response to a request. For example, additional data can be used to determine that the fire at the property 110 is still ablaze after the device 108 drops water on the fire. A camera of property 110 can capture images of the fire. Data corresponding to the captured images of the fire can be sent to the control unit 104 for processing. The control unit 104 can determine, based on the data that the fire is still ablaze. The additional data can be used to deploy additional devices to the property 110. Similarly, sensors on the property 110 can be used to determine that the fire is no longer ablaze and that operations to put out the fire can cease.

The process 300 includes deploying the devices to the location (308). For example, the mobile docking station 106 with water transporting capabilities, is sent to the property 110. The mobile docking station 106 also carries the devices 108 and 109. The mobile docking station 106 can deploy the device 108. In some implementations, the devices 108 and 109 are configured to dock with one or more mobile docking stations including the mobile docking station 106.

In some implementations, one or more devices of the devices are deployed to specific locations corresponding to the given location. For example, the devices can include the mobile docking station 106 and the device 108. The device 108 can be a form of aerial device that is able to fly. In some implementations, the device 108 may use any modality of travel that the mobile docking station 106 cannot whether that is aerial, aquatic, fitting into a tight space, among others. The mobile docking station 106 can receive a signal from the control unit 104 where the signal is configured to instruct mechanisms on the mobile docking station 106 to move the mobile docking station 106 into a second location that is within a first distance from the location. In some implementations, the control unit 104, or another element of the system 100 may determine the second location based on the environment surrounding the second location and the travel modalities available to the mobile docking station 106. For example, the second location can be the closest point to the location of interest that is on a road for an exclusively road-going mobile docking station. The second location can be chosen based on movement capabilities of the mobile docking station 106.

In some implementations, the control unit 104, or another element of the system 100, may determine what travel modalities are needed to approach a particular location of interest. For example, as shown in the example of FIG. 1, the control unit 104, or another element of the system 100, can determine that the mobile docking station 106 will be unable to move from a road nearby the property 110 to a location that is closer to the property 110 in which to carry out a service request based on known movement capabilities of the mobile docking station 106 (e.g., the mobile docking station 106 may be a road-going device with preferences set to avoid non road-going travel). The control unit 104, or another element of the system 100, may identify another device with different movement capabilities to be deployed in addition to the mobile docking station 106. In some cases, the other device can be deployed from the mobile docking station 106.

In some implementations, a control unit may determine a specific set of travel modalities based on a given environment and service request. For example, the control unit 104, or any other element of the system 100, can determine what other travel modalities would complement the travel modalities of the mobile docking station 106 for a given service request based on details of the environment needed to be traversed in order to carry out a given service request. The control unit 104, or other device of the system 100, can obtain the details of the environment from stored environment data in a region corresponding to the service request. Such stored environment data can include data that may be updated periodically to reflect an accurate environment and in order to deploy the devices with the correct travel modalities. In some cases, the stored environment data is updated based on weather or other situation factors such as smoke, traffic, hazards, among others that may affect a determination of what travel modalities are required to carry out a service request. The stored environment data may also include preferences from users based on what devices and what travel modalities would be preferred for a given service request. The control unit 104, or other element of the system 100, can determine, based on the service request and one or more preferences associated with the service request or a user sending the service request, what devices with what modalities should be deployed.

In some implementations, the mobile docking station 106 is a road-going mobile docking station. For example, the control unit 104 can send a signal to the mobile docking station 106 to navigate to an area of road that is closest to the location. Once arrived at the area of road that is closest to the location, the mobile docking station 106 can be configured, by the signal or other automated onboard processes, to deploy another device, such as the device 108. The device 108 may be able to move closer to the location than a road-going mobile docking station.

In some implementations, a control unit within a system can deploy devices within an area in preparation for deployment to a location or to collect data within an area. Devices can be set to roam. For example, a mobile docking station can drive around a neighborhood. Other devices can be deployed from a roaming device like the mobile docking station to create a network of devices which can be called upon when a service request is processed.

In some implementations, devices can be deployed based on one or more priorities. For example, devices not tasked can prioritize energy savings by parking or going into a low energy state. Devices not tasked can also prioritize response time by distributing themselves. In some cases, devices can distribute themselves to locations that have fewer devices available than other locations. Devices not tasked can include devices that are not currently tasked as well as devices that have no predicted task in the near future.

The process 300 includes receiving data from a member of the deployed devices (310). For example, the device 108 sends a signal to the control unit 104 indicating that the water gauge 111 of the device 108 is near empty.

The process 300 includes scheduling a pickup of the device based on the received data (312). For example, the control unit 104, based on the data that the water gauge of the device 108 is near empty, can schedule a pickup of the device by a mobile docking station which is capable of filling the water tank of the device 108.

In some implementations, a control unit uses data from a deployed device to determine what device to use for the pickup. For example, before scheduling the pickup of the device 108, the control unit 104 can determine available capabilities of a candidate device to be used for the pickup, such as the second mobile docking station 112. The control unit 104 can access available capabilities of the second mobile docking station 112 from a stored database that includes one or more entries corresponding to one or more mobile docking stations. Each entry can include what known capabilities correspond to a given mobile docking station.

In some implementations, the second mobile docking station 112 can send an update signal to the control unit 104 that includes information on a current status of one or more capabilities. For example, the second mobile docking station 112 can send a signal that the second mobile docking station 112 has depleted a resource and no longer offers the capability provided by the given resource. For example, if the second mobile docking station 112 runs out of pre-charged batteries, the second mobile docking station 112 no longer has the capability of providing pre-charged batteries to devices. If a movement mechanism of the second mobile docking station 112 is non-functional (e.g., a flat tire), the second mobile docking station 112 no longer has the capability of moving to a pickup location nor has it the capability of transporting any device from said pickup location to another location. In general, any capability of a mobile docking station can be included as an available capability.

In some implementations, available capabilities of a device are compared with required capabilities. For example, the data received from a member of the deployed devices can be used by a control unit, such as the control unit 104, to determine a number of required capabilities. In general, required capabilities can include any relevant feature, resource, or ability of a device. In the example of FIG. 1, the data received from the device 108, that is a member of the deployed devices, includes data that the water gauge 111 of the device 108 is near empty. The control unit 104 can determine, based on the data received from the device 108 that a required capability of the device used for pickup of the device 108 is some form of water supply. In the example of FIG. 1, the form of water supply is the water tank 113 of the second mobile docking station 112. The fact that the second mobile docking station 112 has the required capability of being able to provide some form of water supply can, in some implementations, be sufficient to include the second mobile docking station 112 in a set of devices for the pickup of the device 108.

In some implementations, other capabilities and factors are used to determine the second mobile docking station 112 is used for the pickup of the device 108. For example, in addition to or instead of determining available capabilities of the second mobile docking station 112 and required capabilities based on the data received from the device 108, the control unit 104 can determine to select the second mobile docking station 112 for the pickup of the device 108 based on a location of the second mobile docking station 112 or other received data signal from an entity within the system monitored by the control unit 104. For example, a more qualified device, such as a device having more required capabilities or that is closer to the location of the pickup, may be used unless that more qualified device is required to perform another action that may have a higher priority level. In this way, the control unit 104 can choose a device, such as a mobile docking station, for the pickup of the device 108 based on what devices are available and with what capabilities each available device in a given system is equipped.

In some implementations, the device being picked up provides device status information. For example, the device can provide device status information to a control unit. As described in FIG. 1, the device 108 can provide status information to the control unit 104. Based on the status information, the control unit 104 can select the mobile docking station 112 for pickup. In some implementations, selecting the mobile docking station 112 for the pickup includes determining the mobile docking station 112 is capable of moving to a pickup location. In some implementations, selecting the mobile docking station 112 for the pickup includes determining the mobile docking station 112 is able to move to the pickup location within a period of time determined by a status of the device being picked up. For example, the device being picked may be low on fuel or battery and may have a limited ability to move after the power source is depleted. The control unit 104 can select, based on a speed of the mobile docking station 112, the distance between the mobile docking station 112 and the pickup location, and the remaining power supply or other status of the device, the mobile docking station 112 for pickup of the device.

The process 300 includes picking up the device (314). For example, the mobile docking station 112, with a full water tank 113, can be a landing pad for the device 108. The device 108 can be refilled with the water from the full water tank 113.

In some implementations, a location of a second device used in picking up the device is used in order to select the second device for picking up the device. For example, the mobile docking station 112 can provide data that represents the location of the mobile docking station 112 to the control unit 104. The control unit 104 can compare the data corresponding to the location of the mobile docking station 112 to another location. For example, the control unit 104 can compare the data to other data representing a location of another device that is a candidate for picking up the device. In some implementations, the control unit 104 selects the mobile docking station 112 for picking up the device if the location corresponding to the location of the mobile docking station 112 is closer to a location used for picking up the device than the other location of the other device.

In some implementations, more than one service can be rendered by a mobile docking station. For example, the device 108 can refill with water and receive a new battery if a battery on the device 108 is in need of replacement.

Figure 4:
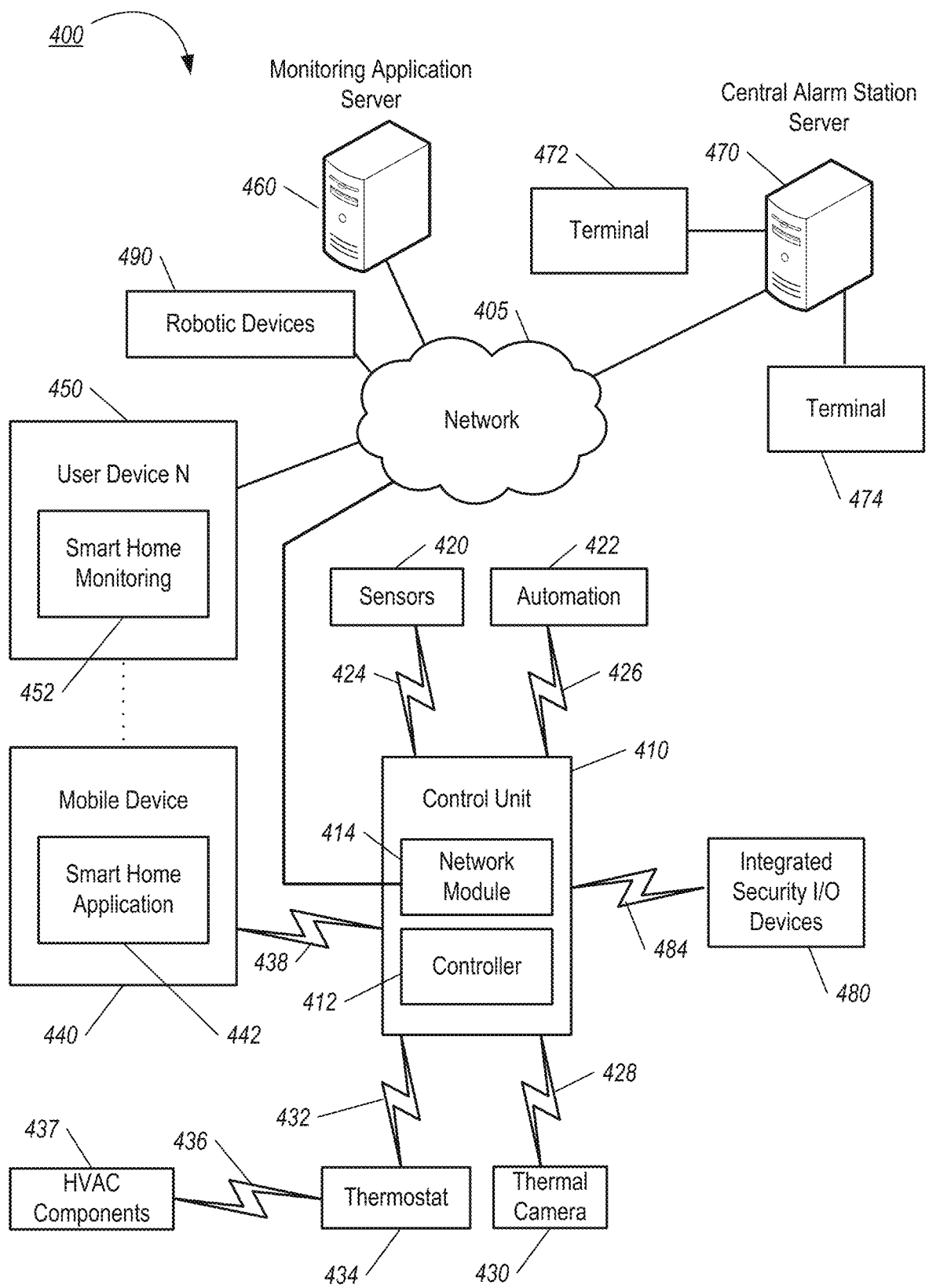
FIG. 4 is a diagram illustrating an example of a property monitoring system.

FIG. 4 is a diagram illustrating an example of a property monitoring system. The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors 420. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data.

The sensors 420 can also include a radio-frequency identification (RFID) sensor that identifies a particular article that includes a pre-assigned RFID tag.

The system 400 also includes one or more thermal cameras 430 that communicate with the control unit 410. The thermal camera 430 may be an IR camera or other type of thermal sensing device configured to capture thermal images of a scene. For instance, the thermal camera 430 may be configured to capture thermal images of an area within a building or home monitored by the control unit 410. The thermal camera 430 may be configured to capture single, static thermal images of the area and also video thermal images of the area in which multiple thermal images of the area are captured at a relatively high frequency (e.g., thirty images per second). The thermal camera 430 may be controlled based on commands received from the control unit 410. In some implementations, the thermal camera 430 can be an IR camera that captures thermal images by sensing radiated power in one or more IR spectral bands, including NIR, SWIR, MWIR, and/or LWIR spectral bands.

The thermal camera 430 may be triggered by several different types of techniques. For instance, a Passive Infra-Red (PIR) motion sensor may be built into the thermal camera 430 and used to trigger the thermal camera 430 to capture one or more thermal images when motion is detected. The thermal camera 430 also may include a microwave motion sensor built into the camera and used to trigger the thermal camera 430 to capture one or more thermal images when motion is detected. The thermal camera 430 may have a "normally open" or "normally closed" digital input that can trigger capture of one or more thermal images when external sensors (e.g., the sensors 420, PIR, door/window, etc.) detect motion or other events. In some implementations, the thermal camera 430 receives a command to capture an image when external devices detect motion or another potential alarm event. The thermal camera 430 may receive the command from the controller 412 or directly from one of the sensors 420.

In some examples, the thermal camera 430 triggers integrated or external illuminators (e.g., Infra-Red or other lights controlled by the property automation controls 422, etc.) to improve image quality. An integrated or separate light sensor may be used to determine if illumination is desired and may result in increased image quality.

The thermal camera 430 may be programmed with any combination of time/day schedules, monitoring system status (e.g., "armed stay," "armed away," "unarmed"), or other variables to determine whether images should be captured or not when triggers occur. The thermal camera 430 may enter a low-power mode when not capturing images. In this case, the thermal camera 430 may wake periodically to check for inbound messages from the controller 412. The thermal camera 430 may be powered by internal, replaceable batteries if located remotely from the control unit 410. The thermal camera 430 may employ a small solar cell to recharge the battery when light is available. Alternatively, the thermal camera 430 may be powered by the controller's 412 power supply if the thermal camera 430 is co-located with the controller 412.

In some implementations, the thermal camera 430 communicates directly with the monitoring server 460 over the Internet. In these implementations, thermal image data captured by the thermal camera 430 does not pass through the control unit 410 and the thermal camera 430 receives commands related to operation from the monitoring server 460.

In some implementations, the system 400 includes one or more visible light cameras, which can operate similarly to the thermal camera 430, but detect light energy in the visible wavelength spectral bands. The one or more visible light cameras can perform various operations and functions within the property monitoring system 400. For example, the visible light cameras can capture images of one or more areas of the property, which the cameras, the control unit, and/or another computer system of the monitoring system 400 can process and analyze.

The system 400 also includes one or more property automation controls 422 that communicate with the control unit to perform monitoring. The property automation controls 422 are connected to one or more devices connected to the system 400 and enable automation of actions at the property. For instance, the property automation controls 422 may be connected to one or more lighting systems and may be configured to control operation of the one or more lighting systems. Also, the property automation controls 422 may be connected to one or more electronic locks at the property and may be configured to control operation of the one or more electronic locks (e.g., control Z-Wave locks using wireless communications in the Z-Wave protocol). Further, the property automation controls 422 may be connected to one or more appliances at the property and may be configured to control operation of the one or more appliances. The property automation controls 422 may include multiple modules that are each specific to the type of device being controlled in an automated manner. The property automation controls 422 may control the one or more devices based on commands received from the control unit 410. For instance, the property automation controls 422 may interrupt power delivery to a particular outlet of the property or induce movement of a smart window shade of the property.

The system 400 also includes thermostat 434 to perform dynamic environmental control at the property. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at the property and/or environmental data at the home, e.g., at various locations indoors and outdoors at the property. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more property automation controls 422.

In some implementations, a module 437 is connected to one or more components of an HVAC system associated with the property, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robot that are capable of moving and taking actions that assist in home monitoring. For example, the robotic devices 490 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and/or roll along the ground, walls, or ceiling) and land vehicle type devices (e.g., automated cars that drive around a property). In some cases, the robotic devices 490 may be robotic devices 490 that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a property. In these examples, the robotic devices 490 include sensors and control processors that guide movement of the robotic devices 490 within the property. For instance, the robotic devices 490 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the property and guide movement of the robotic devices 490 in a manner that avoids the walls and other obstacles.

In addition, the robotic devices 490 may store data that describes attributes of the property. For instance, the robotic devices 490 may store a floorplan of a building on the property and/or a three-dimensional model of the property that enables the robotic devices 490 to navigate the property. During initial configuration, the robotic devices 490 may receive the data describing attributes of the property, determine a frame of reference to the data (e.g., a property or reference location in the property), and navigate the property based on the frame of reference and the data describing attributes of the property. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users at the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, one or more of the thermal cameras 430 may be mounted on one or more of the robotic devices 490.

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the property. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the property. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid state electronic storage that enables the robotic devices 490 to store applications, configuration data, collected sensor data, and/or any other type of information available to the robotic devices 490.

The robotic devices 490 can be associated with one or more charging stations. The charging stations may be located at predefined home base or reference locations at the property. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact-based charging stations and/or wireless charging stations. For contact-based charging stations, the robotic devices 490 may have readily accessible points of contact that the robotic devices 490 are capable of positioning and mating with a corresponding contact on the charging station. For instance, a helicopter type robotic device 490 may have an electronic contact on a portion of its landing gear that rests on and mates with an electronic pad of a charging station when the helicopter type robotic device 490 lands on the charging station. The electronic contact on the robotic device 490 may include a cover that opens to expose the electronic contact when the robotic device 490 is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the property may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device 490 may always use a first charging station and a second robotic device 490 may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the property that is not associated with a charger. The number of community charging stations may be less than the number of robotic devices 490.

Also, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device 490 to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the property automation controls 422, the thermal camera 430, the thermostat 434, and the integrated security devices 480 may communicate with the controller 412 over communication links 424, 426, 428, 432, and 484. The communication links 424, 426, 428, 432, and 484 may be a wired or wireless data pathway configured to transmit signals from the sensors 420, the property automation controls 422, the thermal camera 430, the thermostat 434, and the integrated security devices 480 to the controller 412. The sensors 420, the property automation controls 422, the thermal camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, and 484 may include a local network. The sensors 420, the property automation controls 422, the thermal camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 4 (CAT5) or Category 6 (CAT6) wired Ethernet network. The local network may be a mesh network constructed based on the devices connected to the mesh network.

The monitoring server 460 is one or more electronic devices configured to provide monitoring services by exchanging electronic communications with the control unit 410, the one or more user devices 440 and 450, and the central alarm station server 470 over the network 405. For example, the monitoring server 460 may be configured to monitor events (e.g., alarm events) generated by the control unit 410. In this example, the monitoring server 460 may exchange electronic communications with the network module 414 included in the control unit 410 to receive information regarding events (e.g., alerts) detected by the control unit 410. The monitoring server 460 also may receive information regarding events (e.g., alerts) from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor data, thermal image data, and other monitoring system data received from the monitoring system and perform analysis of the sensor data, thermal image data, and other monitoring system data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, thermal image, and other data to determine an activity pattern of a resident of the property monitored by the system 400. In some implementations, the monitoring server 460 may analyze the data for alarm conditions or may determine and perform actions at the property by issuing commands to one or more of the automation controls 422, possibly through the control unit 410.

The central alarm station server 470 is an electronic device configured to provide alarm monitoring service by exchanging communications with the control unit 410, the one or more mobile devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the smart home application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart home application 442. The smart home application 442 refers to a software/firmware program running on the corresponding mobile device that enables the user interface and features described throughout. The user device 440 may load or install the smart home application 442 based on data received over a network or data received from local media. The smart home application 442 runs on mobile devices platforms, such as iPhone, iPod touch, Blackberry, Google Android, Windows Mobile, etc. The smart home application 442 enables the user device 440 to receive and process image and sensor data from the monitoring system.

The user device 450 may be a general-purpose computer (e.g., a desktop personal computer, a workstation, or a laptop computer) that is configured to communicate with the monitoring server 460 and/or the control unit 410 over the network 405. The user device 450 may be configured to display a smart home user interface 452 that is generated by the user device 450 or generated by the monitoring server 460. For example, the user device 450 may be configured to display a user interface (e.g., a web page) provided by the monitoring server 460 that enables a user to perceive images captured by the thermal camera 430 and/or reports related to the monitoring system. Although FIG. 4 illustrates two user devices for brevity, actual implementations may include more (and, perhaps, many more) or fewer user devices.

The smart home application 442 and the smart home user interface 452 can allow a user to interface with the property monitoring system 400, for example, allowing the user to view monitoring system settings, adjust monitoring system parameters, customize monitoring system rules, and receive and view monitoring system messages.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors 420 and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system 400.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the property automation controls 422, the thermal camera 430, and the robotic devices 490. The one or more user devices 440 and 450 receive data directly from the sensors 420, the property automation controls 422, the thermal camera 430, and the robotic devices 490 (i.e., the monitoring system components) and sends data directly to the monitoring system components. The one or more user devices 440, 450 provide the appropriate interfaces/processing to provide visual surveillance and reporting.

In other implementations, the system 400 further includes network 405 and the sensors 420, the property automation controls 422, the thermal camera 430, the thermostat 434, and the robotic devices 49 are configured to communicate sensor and image data to the one or more user devices 440 and 450 over network 405 (e.g., the Internet, cellular network, etc.). In yet another implementation, the sensors 420, the property automation controls 422, the thermal camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the property automation controls 422, the thermal camera 430, the thermostat 434, and the robotic devices 490 to a pathway over network 405 when the one or more user devices 440 and 450 are farther from the sensors 420, the property automation controls 422, the thermal camera 430, the thermostat 434, and the robotic devices 490. In some examples, the system leverages GPS information from the one or more user devices 440 and 450 to determine whether the one or more user devices 440 and 450 are close enough to the monitoring system components to use the direct local pathway or whether the one or more user devices 440 and 450 are far enough from the monitoring system components that the pathway over network 405 is required. In other examples, the system leverages status communications (e.g., pinging) between the one or more user devices 440 and 450 and the sensors 420, the property automation controls 422, the thermal camera 430, the thermostat 434, and the robotic devices 490 to determine whether communication using the direct local pathway is possible. If communication using the direct local pathway is possible, the one or more user devices 440 and 450 communicate with the sensors 420, the property automation controls 422, the thermal camera 430, the thermostat 434, and the robotic devices 490 using the direct local pathway. If communication using the direct local pathway is not possible, the one or more user devices 440 and 450 communicate with the monitoring system components using the pathway over network 405.

In some implementations, the system 400 provides end users with access to thermal images captured by the thermal camera 430 to aid in decision making. The system 400 may transmit the thermal images captured by the thermal camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the thermal camera 430 or other cameras of the system 400). In these implementations, the thermal camera 430 may be set to capture thermal images on a periodic basis when the alarm system is armed in an "armed away" state, but set not to capture images when the alarm system is armed in an "armed stay" or "unarmed" state. In addition, the thermal camera 430 may be triggered to begin capturing thermal images when the alarm system detects an event, such as an alarm event, a door-opening event for a door that leads to an area within a field of view of the thermal camera 430, or motion in the area within the field of view of the thermal camera 430. In other implementations, the thermal camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random-access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
    determining a plurality of devices to send to a location using data that indicates one or more operations to be performed by a first device from the plurality of devices at the location;
    deploying the plurality of devices to the location to cause the first device to perform the one or more operations using a first resource available on the first device;
    receiving, from the first device of the plurality of devices, data that was generated at least in part using sensor data captured by the first device;
    identifying, using the data that was generated at least in part using the sensor data captured by the first device, a mobile docking station equipped with the first resource for a pickup of the first device; and
    deploying the mobile docking station for the pickup of the first device.

2. The method of claim 1, before identifying the mobile docking station equipped with the first resource for the pickup of the first device, further comprising:
    determining one or more available capabilities of the mobile docking station; and
    identifying, based on the data that was generated at least in part using the sensor data captured by the first device of the plurality of devices and the one or more available capabilities of the mobile docking station, the mobile docking station for the pickup of the first device.

3. The method of claim 2, wherein identifying, based on the data that was generated at least in part using the sensor data captured by the first device of the plurality of devices and the one or more available capabilities of the mobile docking station, the mobile docking station for the pickup of the first device comprises:
    determining, based on the data captured by the first device, one or more required capabilities of the mobile docking station;
    determining the one or more available capabilities of the mobile docking station comprise at least the one or more required capabilities; and
    identifying the mobile docking station for the pickup of the first device based on determining the one or more available capabilities of the mobile docking station comprise at least the one or more required capabilities.

4. The method of claim 1, wherein deploying the mobile docking station for the pickup of the first device comprises:
    comparing a current location of the mobile docking station to a current location of a third device; and
    deploying the mobile docking station for the pickup of the first device based on the current location of the mobile docking station being closer to the location than the current location of the third device.

5. The method of claim 1, wherein the plurality of devices comprises the mobile docking station and a third device, and wherein deploying the plurality of devices to the location comprises:
    deploying the mobile docking station to a second location that is within a first distance from the location; and
    configuring instructions on the mobile docking station to enable deploying of the third device from the mobile docking station to a third location that is within a second distance from the location, wherein the second distance is less than the first distance.

6. The method of claim 5, wherein deploying the mobile docking station to the second location that is within the first distance from the location comprises:
    determining a first region in which the mobile docking station is configured to operate;
    determining a second region adjacent to the first region in which the mobile docking station is not configured to operate; and
    determining a location within the first region that is closest to the location as the second location, wherein the first region does not include the second region.

7. The method of claim 6, wherein the mobile docking station is a road-going mobile docking station and the first region is a section of road.

8. The method of claim 1, further comprising:
    deploying the mobile docking station for autonomous patrol; and
    sending system status information to the mobile docking station to inform movements of the mobile docking station during autonomous patrol.

9. The method of claim 8, wherein deploying the mobile docking station for autonomous patrol comprises:

determining a number of active mobile docking stations in a first service region;

determining the number of active mobile docking stations in the first service region satisfies a threshold; and in response to determining the number of active mobile docking stations in the first service region satisfies the threshold, deploying the mobile docking station for autonomous patrol in the first service region.

10. The method of claim 1, wherein the data from the first device of the plurality of devices comprises device status information and identifying the mobile docking station for the pickup of the first device comprises identifying the mobile docking station for the pickup of the first device using the device status information.

11. The method of claim 10, wherein identifying the mobile docking station for the pickup of the first device using the device status information comprises:

determining a first device location of the first device based on the device status information;

determining a second device location of the mobile docking station second device;

determining the mobile docking station is capable of moving to a second location in a vicinity of the first device location based on determining that the mobile docking station has movement capabilities and determining that the second device location is within a threshold distance of the first device location; and identifying the mobile docking station for the pickup of the first device based on determining the mobile docking station is capable of moving to the second location.

12. The method of claim 11, wherein the threshold distance is calculated based on a computed route from the second device location to the second location, a speed of the mobile docking station, and a required pickup time for the pickup of the first device, wherein the second location is where the pickup of the first device occurs.

13. The method of claim 1, wherein determining the plurality of devices to send to the location comprises:

determining one or more required capabilities using data of a service request that includes performing the one or more operations;

determining one or more available capabilities for each device of the plurality of devices;

determining the one or more available capabilities for each device of the plurality of devices comprise at least the one or more required capabilities; and determining the plurality of devices to send to the location based on determining the one or more available capabilities for each device of the plurality of devices comprise at least the one or more required capabilities.

14. The method of claim 1, wherein determining the plurality of devices to send to the location comprises:

determining one or more required capabilities using data of a service request that includes performing the one or more operations;

determining a first set of one or more available capabilities for the first device;

determining a second set of one or more available capabilities for a third device;

comparing the first set of one or more available capabilities and the second set of one or more available capabilities to the one or more required capabilities; and based on comparing the first set of one or more available capabilities and the second set of one or more available capabilities to the one or more required capabilities, identifying the first device as a member of the plurality of devices to the location and not selecting the third device.

15. The method of claim 1, comprising determining assignment details based on a service request, wherein determining the assignment details comprises:

parsing the service request to determine the service request is a request of a first user; and determining, based on determining the service request is a request of the first user, a priority level of the service request.

16. The method of claim 15, wherein determining the priority level of the service request comprises:

determining a user subscription tier corresponding to the first user; and determining the priority level of the service request based on the user subscription tier.

17. The method of claim 1, wherein the plurality of devices comprises the mobile docking station and one or more devices that are configured to dock with the mobile docking station.

18. The method of claim 1, wherein the plurality of devices are deployed at a second location, and wherein the pickup of the first device occurs at a third location that is different from the second location.

19. A system comprising one or more computers and one or more storage devices on which are stored instructions that are operable, when executed by the one or more computers, to cause the one or more computers to perform operations comprising:

determining a plurality of devices to send to a location using data that indicates one or more operations to be performed by a first device from the plurality of devices at the location;

deploying the plurality of devices to the location to cause the first device to perform the one or more operations using a first resource available on the first device;

receiving, from the first device of the plurality of devices, data that was generated at least in part using sensor data captured by the first device;

identifying, using the data that was generated at least in part using the sensor data captured by the first device, a mobile docking station equipped with the first resource for a pickup of the first device; and deploying the mobile docking station for the pickup of the first device.

20. A non-transitory computer storage medium encoded with instructions that, when executed by one or more computers, cause the one or more computers to perform operations comprising:

determining a plurality of devices to send to a location using data that indicates one or more operations to be performed by a first device from the plurality of devices at the location;

deploying the plurality of devices to the location to cause the first device to perform the one or more operations using a first resource available on the first device;

receiving, from the first device of the plurality of devices, data that was generated at least in part using sensor data captured by the first device;

identifying, using the data that was generated at least in part using the sensor data captured by the first device, a mobile docking station equipped with the first resource for a pickup of the first device; and deploying the mobile docking station for the pickup of the first device.

\* \* \* \* \*